United States Patent
Benzler et al.

(10) Patent No.: US 9,566,965 B2
(45) Date of Patent: Feb. 14, 2017

(54) BRAKING SYSTEM AND METHOD FOR DIMENSIONING A BRAKING SYSTEM

(71) Applicant: Robert Bosch GmbH, Stuttgart (DE)

(72) Inventors: Steffen Benzler, Eberdingen (DE); Michael Kunz, Steinheim an der Murr (DE); Stefan Strengert, Stuttgart (DE); Heiko Druckenmueller, Mundelsheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/653,962

(22) PCT Filed: Nov. 11, 2013

(86) PCT No.: PCT/EP2013/073493
§ 371 (c)(1),
(2) Date: Jun. 19, 2015

(87) PCT Pub. No.: WO2014/106548
PCT Pub. Date: Jul. 10, 2014

(65) Prior Publication Data
US 2015/0367823 A1    Dec. 24, 2015

(30) Foreign Application Priority Data
Jan. 3, 2013    (DE) .................. 10 2013 200 045

(51) Int. Cl.
*B60T 8/40*    (2006.01)
*B60T 8/50*    (2006.01)
(Continued)

(52) U.S. Cl.
CPC ............... *B60T 8/404* (2013.01); *B60T 8/176* (2013.01); *B60T 8/346* (2013.01); *B60T 8/4031* (2013.01);
(Continued)

(58) Field of Classification Search
CPC .......... B60T 8/404; B60T 8/176; B60T 8/346; B60T 8/4031; B60T 8/50
See application file for complete search history.

(56) References Cited

U.S. PATENT DOCUMENTS

2005/0134110 A1    6/2005    Reuter
2008/0140293 A1    6/2008    Haller
(Continued)

FOREIGN PATENT DOCUMENTS

| | | |
|---|---|---|
| DE | 19820884 | 11/1999 |
| DE | 102009046273 | 5/2011 |
| WO | WO2008/017726 | 2/2008 |

*Primary Examiner* — Vishal Sahni
(74) *Attorney, Agent, or Firm* — Norton Rose Fulbright US LLP; Gerard Messina

(57) ABSTRACT

A method for dimensioning a component of a braking system; the braking system having at least two brake-circuit partial circuits; each brake-circuit partial circuit having at least one pump element for building up a brake-circuit pressure and/or for returning brake-circuit fluid in an ABS case, the pump elements of the at least two brake-circuit partial circuits being operable using a motor element; and the at least two brake-circuit partial circuits being separable using a separating element, so that different brake-circuit pressures may be created in the at least two brake-circuit partial circuits.

13 Claims, 3 Drawing Sheets

(51) Int. Cl.
*B60T 8/176* (2006.01)
*B60T 8/34* (2006.01)
*B60T 8/26* (2006.01)

(52) U.S. Cl.
CPC .. *B60T 8/50* (2013.01); *B60T 8/26* (2013.01); *B60T 8/4072* (2013.01); *B60T 2201/022* (2013.01); *B60T 2270/82* (2013.01)

(56) References Cited

U.S. PATENT DOCUMENTS

| 2011/0231076 A1* | 9/2011 | Watanabe | B60T 8/1755 701/70 |
| 2012/0049617 A1 | 3/2012 | Furuyama | |
| 2012/0212042 A1* | 8/2012 | Kunz | B60T 1/10 303/2 |

* cited by examiner

BRAKING SYSTEM AND METHOD FOR DIMENSIONING A BRAKING SYSTEM

FIELD OF THE INVENTION

The present invention relates to braking system technology. In particular, the present invention relates to braking systems having increased pressure buildup dynamics. Furthermore, the present invention relates in particular to a method for dimensioning a component of a braking system, a braking system for a vehicle, and a vehicle having a braking system according to the present invention.

BACKGROUND INFORMATION

Braking systems are used in vehicles to perform deceleration of a vehicle in a targeted and in particular moderate way during regular driving operation. In particularly extremal situations, for example, full braking, a braking system is frequently operated at its limit, to carry out the best possible or quickest possible braking of the vehicle, for example, to a standstill.

One such scenario in which full braking may be necessary is pedestrian protection. It may thus occur, for example, due to inattention of the driver of a vehicle or also of the pedestrian himself, that the distance between a vehicle and the pedestrian is sufficiently small so that full braking of the vehicle has to be carried out to ensure the physical integrity of the pedestrian. When a pedestrian is referred to hereafter, this is to be considered any object in the travel path of a vehicle which will possibly be significantly damaged in the event of a collision with the vehicle. This may be, in addition to conventional pedestrians, for example, bicycle riders, animals, stationary objects, or also other, in particular smaller vehicles.

It is foreseeable that future vehicle technology is to fulfill increased demands from the field of pedestrian protection. In this case, through suitable recognition and in particular partially autonomous or autonomous braking intervention, a collision with an object, for example, a pedestrian or the like, is to be prevented. A system improvement usually provides a shorter braking distance. The braking distance is determined not least according to possible dynamics of a braking system, therefore, how rapidly a requested pressure may be built up in a braking system in order to actuate brake elements on the wheels, for example.

Sensors and suitable software for reliably recognizing a pedestrian are also required, however, a possible braking power of a vehicle is essentially determined by the pressure buildup dynamics of the braking system. The demands on a braking system with regard to the pedestrian protection are therefore pressure dynamics demands for this braking system. For improved pedestrian protection, a braking system having the greatest possible pressure buildup dynamics is required, to make a time delay as short as possible between initiation of a braking action and final application of the brakes, therefore the full deceleration of the vehicle.

SUMMARY

One aspect of the present invention may be considered that of improving a braking system by targeted dimensioning of a component of the braking system, for example, a pump element, which substantially influences the pressure buildup dynamics of the braking system.

Braking systems may be designed differently.

On the one hand, a braking system may operate solely using a hydraulic pressure, which is applied by a driver to the brake pedal and is passed through suitably distributed and designed hydraulic lines in the vehicle up to the brake elements on the wheels, where brake elements are pressed against one another by this pressure and thus deceleration of the vehicle takes place as a result of the elevated friction of the brake elements among one another. Additionally or alternatively to such a solely hydraulic-based braking system, the braking system may furthermore have pressure-boosting elements, for example, a motor element and pump elements. In the ABS case, such an element may also have a pressure-reducing function, for example, by returning a hydraulic fluid from the brake circuit.

The motor element is activated by the pedal movement of the brake pedal, optionally using sensors/control unit, and in turn drives the pump elements to provide an additional brake force or a further pressure buildup in the braking system, beyond the sole brake force from the driver. An active or partially-active pressure buildup is described here, which may be triggered by many further events, for example, to implement autonomous braking for pedestrian protection on the basis of video and/or radar information. A comparatively low pedal pressure or no pedal movement at all may thus induce a high hydraulic pressure in the braking system. A motor-assisted braking system of this type may also be referred to as a brake-by-wire system.

In the case of a brake-by-wire system, a partial brake-by-wire system and a complete brake-by-wire system are conceivable. The partial brake-by-wire system has a motor element and pump elements, which introduce a pressure into the hydraulic line system in addition to the brake pressure of the driver introduced via a brake pedal, while a complete brake-by-wire system essentially exclusively activates motor elements, which in turn build up a hydraulic line pressure using pump elements.

A particularly extremal operating case for this purpose is the so-called ABS operating case. In this case, such a high brake pressure is generated that the wheels essentially completely lock because of the brake elements, and therefore transition from rolling friction into sliding friction. A further pressure buildup in the system therefore does not result in further increased braking effect; rather, the overall braking effect is even reduced because of the sliding friction of the tires in relation to a state with maximum possible brake force and rolling friction. In an ABS operating case, the system pressure of the hydraulic system is now reduced further at intervals, so that the wheels return from their unfavorable sliding friction state into a favorable rolling friction state.

An ABS operating case therefore essentially represents the highest possible pressure in the hydraulic line system. If a motor element and pump elements are now selected to assist a driver in case of braking, they thus have to be dimensioned in such a way that they still provide a sufficient delivery capacity for a pressure buildup or for a return of fluid against the pressure in the master brake cylinder, which is the highest possible in the ABS case, also in this worst operating scenario to be assumed (worst case). In the ABS case, the pump element is used to implement a pressure dissipation in the wheel brake calipers. The system pressure is reduced in that the pump element returns excess fluid from the brake circuit into the master brake cylinder, to which a very high pressure is applied by the driver, usually implemented via the outlet valves for the wheels and a storage chamber for temporarily storing the fluid.

An operating point is mapped as a value pair of motor speed and the torque applied to the motor element in this case. An operating point in an ABS braking case represents a comparatively high motor torque with a comparatively low speed. This operating point is the extremal operating point of the braking system, for which the motor element has to be designed. In other words, it must be ensured in such a worst-case brake scenario that this operating point is not exceeded, in particular that a higher motor torque does not occur, which would result in a speed reduced still further, whereby a delivery capacity of a pump element would possibly be too low to build up a desired brake pressure.

To now relieve a motor element, a separating element may be provided, which, for example, in the case of a dual-circuit braking system having a brake-circuit partial circuit for a first axle and a second axle, for example, a front axle and a rear axle, decouples a brake-circuit partial circuit from the pressure application by, for example, the brake pedal of a partial brake-by-wire system. In this way, a lower hydraulic line pressure will usually occur in the decoupled brake-circuit partial circuit than in the non-decoupled brake-circuit partial circuit. Since a motor element regularly jointly supplies the separate pump elements of the two brake-circuit partial circuits, because of the reduced pressure in one brake-circuit partial circuit, the total demand on the motor element is reduced. Due to the reduced torque or motor torque resulting therefrom, a higher speed results for the motor element. The operating point of the motor element therefore shifts from the worst-case operating point or the extremal operating point, at which sufficient braking power is still available, to an operating point which relieves the motor element in relation to the extremal ABS operating point. Extremal is to be understood hereafter as a state in which an element may just still fulfill a required function.

In other words, this means that the motor element is no longer operated at its limit, however, but rather that reduced demands are placed on the motor element. These reduced demands now enable the motor element to be altered in such a way that this motor element, also in the operating state having the actually reduced demands, is again operated at its extremal operating point, therefore at the limit. Such a shift of the operating point may be taken into consideration in the dimensioning of a special braking system in that, for example, a motor element having a lower delivery capacity is provided, which results in a cost reduction for the braking system, for example. Similarly, such an altered motor element may have a lower weight, for example. A lower weight generally also means lower fuel consumption for a vehicle.

Alternatively, at least one pump element may be altered, while the motor element is essentially maintained, so that the operating point of the motor element does again fall to the extremal operating point, but a delivery capacity of a pump element in the hydraulic system increases. Such an increase of the delivery capacity in turn positively influences the pressure buildup dynamics of a braking system. In other words, by way of the targeted load of a motor element, a previously performed relief, for example, by disconnection or separation of a brake-circuit partial circuit, is used to be able to provide pump elements, which thus provide the braking system with higher dynamics, which in turn has a positive effect on the pedestrian protection.

DETAILED DESCRIPTION

One exemplary embodiment of a braking system according to the present invention will be described in greater detail with reference to FIG. 1.

Figure 1:
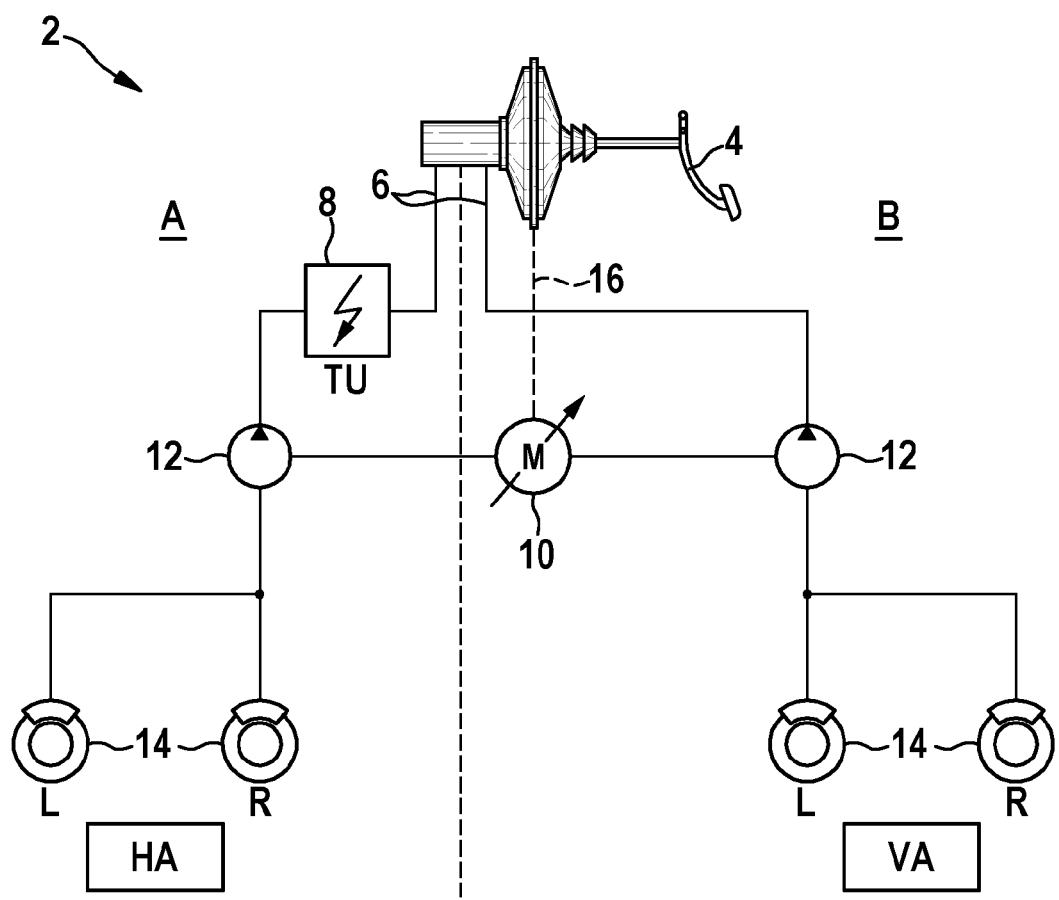
FIG. 1 shows a schematic exemplary embodiment of a braking system according to the present invention.

FIG. 1 shows a braking system 2 in highly simplified form, which is designed as a partial brake-by-wire system. On the one hand, a driver, by using brake pedal 4, may introduce a brake pressure into hydraulic line system 6, which finally leads to four wheels 14, for example, with use of suitably situated and guided hydraulic lines 6.

The hydraulic pressure acts on brake components (not shown in greater detail) on wheels 14, whereby braking of wheels 14 and therefore deceleration of the vehicle occurs. As an example, braking system 2 of FIG. 1 is divided into two brake-circuit partial circuits A and B, brake-circuit partial circuit A corresponding to the rear axle in the example while brake-circuit partial circuit B corresponds to the front axle of a two-axle vehicle in the example.

In addition, pump elements 12 are provided in hydraulic line system 6, which, activated by motor element 10, may also cause a pressure buildup in hydraulic line system 6. Motor element 10 is connected to brake pedal 4 using a communication link 16 and receives items of information with regard to a requested motor action in conjunction with a braking operation via this connection. In general, a motor element is connected via a communication link to a control unit, since pressure requests may also be placed without brake pedal operation.

Brake-circuit partial circuit A of the rear axle exemplarily has a separating element 8, for example, a separating valve, which decouples the further brake-circuit partial circuit from the hydraulic influence by brake pedal 4 of the driver. A hydraulic pressure introduced by the brake pedal into the hydraulic system is now essentially introduced into hydraulic line system 6 of brake-circuit partial circuit B of the front axle, while hydraulic line system 6 of brake-circuit partial circuit A is not subject to such a pressure buildup downstream from separating element 8.

Pump elements 12 also have to react to a prevailing hydraulic line pressure, to in turn cause a further pressure buildup in the hydraulic system. In addition to a pressure buildup, an ABS case is a worst-case scenario. In the ABS case, the goal of running the pump is to return the hydraulic fluid from the brake circuit into a master brake cylinder, i.e., against the high driver pressure, therefore to empty the storage chamber. The introduction of an additional pressure or the delivery of fluid into a hydraulic line system, in which a comparatively high pressure already prevails, is more difficult than into a hydraulic line system having a lower hydraulic line pressure. For example, if a hydraulic line pressure of 200 bar is built up by the driver using brake pedal 4, particular pump element 12 must thus work against this line pressure. This in turn places increased demands on motor element 10. For example, if separating element 8 restricts the line pressure of the brake-circuit partial circuit to essentially 100 bar, at least pump element 12 in this brake-circuit partial circuit is stressed less than in the brake-circuit partial circuit in which the separation does not take place and in which the exemplary 200 bar prevail. If a pump element 12 is to operate in a brake-circuit partial circuit with 100 bar, while a further pump element is to operate in a brake-circuit partial circuit with 200 bar, this places reduced demands on motor element 8 in comparison to a usage scenario in which both pump elements 12 are to operate in a brake-circuit partial circuit with a hydraulic pressure of 200 bar.

Examples of schematic illustrations of operating points of a motor element of the braking system of FIG. 1 will be described hereafter with reference to FIGS. 2a, b.

Figure 2A:
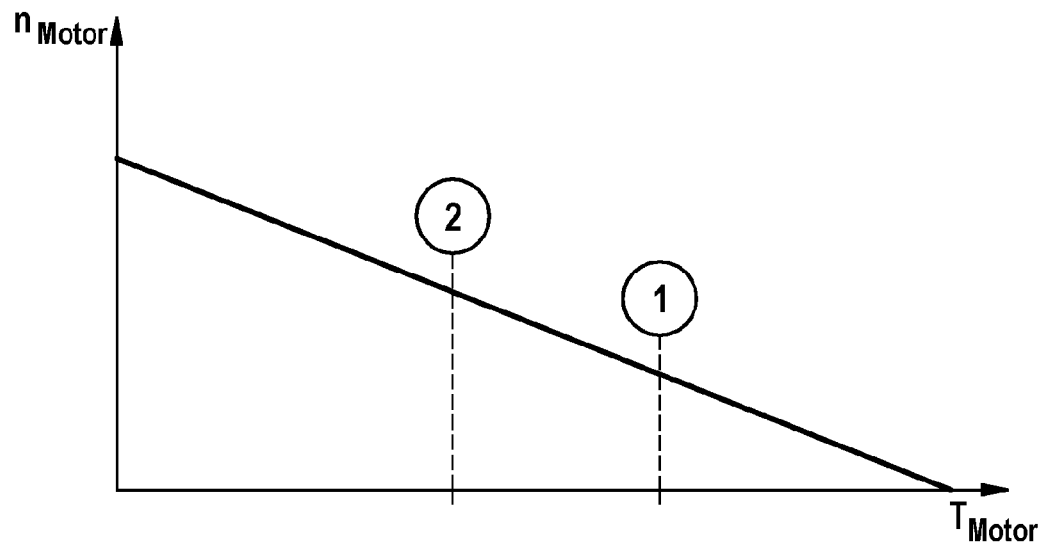
FIGS. 2a, b show examples of schematic views of operating points of a motor element of the braking system of FIG. 1.

FIGS. 2a, b show the motor characteristic curve of an exemplary motor element 10, in particular of an ESP or ESPhev (hybrid electric vehicle) system. An operating point represents a value pair of a speed $n_{motor}$ and a motor torque $T_{motor}$. If the demand on the motor element is reduced, a lower motor torque thus results, which results in an increased speed and vice versa. In the case of the increased demands on the motor element, of an increased requested motor torque, the motor element operates with a reduced speed.

Therefore, achievable speed $n_{motor}$ is shown in the motor characteristic curve of FIG. 2a over motor torque $T_{motor}$. This speed characteristic curve drops over the motor torque, which finally illustrates that in the event of increased motor torque, only reduced speeds are still implementable.

The following behavior results in conjunction with a pump element 12, for example, a piston pump. The hydraulic pressure, against which pump element 12 has to work, causes a torque, which has to be applied by the motor, via corresponding active areas and levers. In contrast, the speed of the pump motor results via the corresponding pump geometry in a hydraulic volume flow rate, which the pump may provide. A pump characteristic curve thus results, which enables a high delivery capacity in the event of low counter pressures in the hydraulic line system, while only a lower delivery capacity is available in the event of higher pressures in the hydraulic line system.

For example, in the case of a piston pump, the active areas, levers, and pump geometries are essentially determined by the number of the pistons, a piston diameter, and the eccentricity. An increase of the number of pistons, an enlargement of the piston diameter, and an increase of the eccentricity result in an increase of the volume displaced per revolution, therefore in a higher delivery capacity of a pump element per revolution, but also in a higher counter torque for a motor element at the same time, and therefore a lower speed of the motor element.

An essential design point for a motor element, in particular for an ESP system, is the required delivery capacity at high driver pressures, therefore high pressures introduced via brake pedal 4 into the hydraulic line system, in an extremal case, for example, the ABS case. Operating point 1 in FIG. 2a represents an operating state of braking system of FIG. 1, in which in the ABS case, separating element 8 does not separate, but rather the same pressure, in particular the pressure applied by the driver, prevails in both brake-circuit partial circuits A, B. Therefore, in this usage example, the pump elements still have to achieve a specific delivery flow rate with, for example, 200 bar driver pressure in hydraulic line system 6, to be able to carry out ABS-specific measures, for example, such as ensuring the ABS return or storage chamber emptying of a braking system.

This driver pressure is therefore applied to both brake-circuit partial circuits, a pump element must therefore provide the specified volume flow rate against this doubled driver pressure in both brake-circuit partial circuits. The motor torque of the motor element is determined in this operating point by the doubled driver pressure. To achieve the specified delivery capacity, the motor must still provide a corresponding speed at this very high torque. The pump geometry and motor power must therefore be adapted in such a way that required specifications may still be maintained. Operating point 1 represents an extremal operating point in this case, in particular an operating point for the minimum permitted motor element speed or the maximum permitted motor torque.

A delivery capacity for highly-dynamic functions is typically defined at low pressures, however. Achievable pressure dynamics thus result from the idle speed of a motor element without torque or with only low torques and a corresponding pump geometry. Operating point 2 shows the same braking system of FIG. 1, but in an operating case in which separating element 8 disconnects brake-circuit partial circuit A, and a driver pressure is therefore exclusively introduced into brake-circuit partial circuit B. The pressure applied by the driver to the front axle also acts here on pump element 12, similarly to operating point 1. In this case, also an ABS case, however, separating element 8, the separating valve at the rear axle, is closed. In this way, the pressure applied by the driver does not act on the rear axle or in the associated hydraulic line system, but rather the wheel pressure of the rear axle wheels.

In the ABS case, the wheel pressure is always less than the pressure applied by the driver. A lower pressure level in total thus results, against which the two pump elements 12 have to work in total, for example, a front axle pressure of 200 bar and a rear axle pressure of 100 bar. Pump element 12 in brake-circuit partial circuit A therefore has to work against a lower counter pressure, which in turn reduces the motor torque to be applied jointly for motor element 10. The torque load of the motor is thus reduced, whereby operating point 2 arises. As is apparent in FIG. 2a, however, operating point 2 is not equal to operating point 1; therefore, motor element 10 does not operate in its extremal operating point. In other words, every operating point between operating point 2 and operating point 1 would be, in the case in which separating element 8 disconnects a brake-circuit partial circuit, a still permitted operating point for motor element 10, to still be able to provide a specified or requested delivery capacity. This reserve or underload of motor element 10 may be used for the purpose, for example, of using, in at least one brake-circuit partial circuit, for example, on the front axle, pump elements having altered pump geometries, which do have a higher counter torque, but finally apply a higher motor torque to motor element 10 at equal counter pressure and thus shift the operating point from operating point 2 in the direction of operating point 1, but displace a significantly larger volume per revolution in exchange. An ABS specification may nonetheless be maintained, since the higher front axle torque is compensated for by the lower rear axle torque. In the best case, the pump elements may be altered in such a way that, for example, in the ABS case, operating point 1 again arises, but having a significantly increased delivery volume in all operating points. This increased delivery volume increases the pressure dynamics of the braking system at the same time.

Since a larger volume displacement per revolution results at the front axle in the case of the correspondingly altered pump element, significantly higher delivery capacities may be achieved here. As an example, at equal motor power on the front axle, instead of a pump element having a diameter of 6.5 mm, such a pump element having a diameter of 8 mm may be used. A delivery capacity may therefore be increased by approximately 50%, which may increase the pressure dynamics of a braking system in such a way that, for example, for pedestrian protection, a braking distance shortening at 40 km/h of approximately 1.5 m to 2.5 m results.

In general, the concept according to the present invention has the result in particular that in an ABS case, at least one brake-circuit partial circuit is decoupled from a driver pressure or in general the hydraulic line pressure is kept at a lower level, whereby a relief of a motor element results.

Figure 2B:
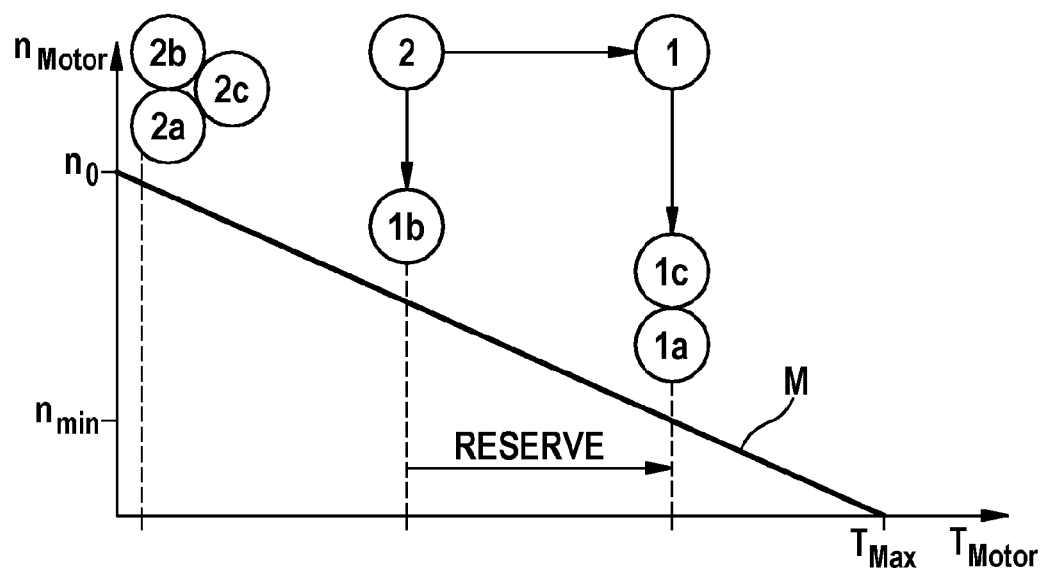

Three differently designed braking systems will be compared hereafter with reference to FIG. 2b.

System a is directed to a conventional braking system according to FIG. 1, in which in the ABS braking case, separating element 8 does not separate or is possibly not even provided. System b in turn represents the system of FIG. 1, which opens separating element 8 and therefore disconnects brake-circuit partial circuit A from the driver pressure, while pump elements 12 and motor element 10 are left unchanged. System c in turn corresponds to system b, pump elements 12 and/or motor element 10 having been altered in such a way that the operating point is shifted from operating point 1b to operating point 1a and therefore corresponds to operating point 1b. This corresponds to the shift, which was described above with use of FIG. 2a, of operating point 2 to operating point 1 by redimensioning either pump elements 12 and/or motor element 10.

Operating point 1a represents the worst-case operating point, therefore the ABS case for system a, characterized by a high counter torque of the pump motor. Operating point 1b represents the worst-case operating point, therefore the ABS case for system b, characterized by a moderate speed and a moderate counter torque of the pump motor. This was achieved by disconnecting one brake-circuit partial circuit from the driver pressure, the remaining parameters are essentially unchanged. In turn, operating point 1c represents the worst-case operating point in the ABS case for system c, characterized by a high counter torque of the pump motor. Operating point 1b became operating point 1c by corresponding redimensioning or another selection of pump elements 12 or of motor element 10. Operating points 2a, b, c, which are essentially identical, correspond to the operating points for autonomous braking of all systems, characterized by very high speed and low counter torque of the pump motor. In every operating point 1, a sufficient delivery capacity of the pump has to be guaranteed for safety reasons. However, since only operating points 1a and 1c represent extremal operating points of motor element 10, which may not be undershot in any case (torque overshoot or speed undershot), operating point 1b has a certain reserve which, as described above, enables the use of differently dimensioned pump elements. The operating points shown in FIGS. 2a, b result in the example of a piston pump by counter torque M of the motor according to equation 1.

$$M = M_{fric} + \frac{\pi}{4} * e * (p_1 * d_1^2 - p_2 * d_2^2) \quad \text{Equation 1}$$

having friction torque $M_{fric}$, eccentricity e of the pump, pressures $p_1$, $p_2$ in first and second brake-circuit partial circuits A, B, and diameters $d_1$ and $d_2$ of pump elements 12 in the first and second brake-circuit partial circuits. Active areas of the pump elements result from $\pi/4*d^2$. The force results as active area * pressure p. The associated motor speeds result by way of the motor characteristic curve of FIG. 2a, b.

Operating points 1/1a/1c generally represent a first operating point, operating points 2/1b generally represent a second operating point, and operating points 2a/2b/2c generally represent a third operating point.

The delivery volume flow rate for each brake circuit may be estimated and adjusted via the number and the areas of the pump elements, the eccentricity, and the speed of the motor. One aspect is now the improvement or increase of the delivery volume flow rate for third operating point 2a/2b/2c.

Due to the enlarged active areas of the pump elements in a brake-circuit partial circuit, for example, the front axle circuit of system c, significant improvements of the delivery capacity may be achieved in third operating point 2a/2b/2c. In other words, due to the shift of operating point 1b to operating point 1c as a result of altered dimensioning of the pump elements, not only is the volume flow rate altered or increased in the particular brake-circuit partial circuit in worst-case operating points 1, but rather thereafter in the same way for normal operating points 2. The volume flow rates in operating point 1 are nonetheless not less than in system a, and therefore not less than permitted or required in the extremal case.

Typical value ranges for pump torque, speed, and the volume flow rates on front axle and rear axle of an exemplary braking system in operating points 1 and 2 are shown in Table 1.

TABLE 1

|  | system a: | system b: | system c: |
| --- | --- | --- | --- |
| Pump torque $M_{ABS}$ in Ncm | 100-140 | 60-90 | 100-140 |
| Motor speed n in RPM | 2000-2500 | 3500-3800 | 2000-2500 |
| Volume flow rates: |  |  |  |
| FA operating point 2 in cm³/s | 10.0-12.0 | 10.0-12.0 | 18.0-20.0 |
| RA operating point 2 in cm³/s | 10.0-12.0 | 10.0-12.0 | 12.0-14.0 |
| FA operating point 1 in cm³/s | 4.0-6.0 | 7.0-9.0 | 8.0-10.0 |
| RA operating point 1 in cm³/s | 4.0-6.0 | 7.0-9.0 | 4.0-6.0 |

Table 2 shows exemplary values as examples for volume flow rates including the associated pump variants for system a, partial brake-by-wire system b, and brake-by-wire system c having improved pressure dynamics. In this example, a motor element has a maximum speed of $n_{max}$=4500 RPM and a maximum torque $M_{max}$=220 Ncm at an exemplary friction torque $M_{fric}$=30 Ncm.

TABLE 2

|  | system a: | system b: | system c: |
| --- | --- | --- | --- |
| Pump geometry: |  |  |  |
| $d_{FA}$ in mm | 6 | 6 | 7.5 |
| $d_{RA}$ in mm | 6 | 6 | 6 |
| e in mm | 0.9 | 0.9 | 1 |
| Active area FA in mm² | 28.27 | 28.27 | 44.18 |
| Active area RA in mm² | 28.27 | 28.27 | 28.27 |
| Lever arm in mm | 0.9 | 0.9 | 1 |
| Operating point 1: |  |  |  |
| $p_{FA}$ in bar (operating point 1) | 250 | 250 | 250 |
| $p_{RA}$ in bar (operating point 1) | 250 | 60 | 60 |
| Pump torque $M_{ABS}$ in Ncm | 130 | 80 | 130 |
| Motor speed n in RPM | 1900 | 2800 | 1900 |
| Volume flow rates: |  |  |  |
| FA operating point 1 in cm³/s | 4.8 | 7.3 | 8.3 |
| RA operating point 1 in cm³/s | 4.8 | 7.3 | 5.4 |
| FA operating point 2 in cm³/s | 11.5 | 11.5 | 20.0 |
| RA operating point 2 in cm³/s | 11.5 | 11.5 | 13.0 |

As may be inferred from the values of Table 2, with a hardly changed value pair of motor torque/speed, therefore with essentially uniform operating point of systems a and c, a significantly higher delivery capacity in operating point 2 may be achieved by an altered pump geometry.

An exemplary embodiment of the method for dimensioning a component of a braking system according to the present invention will be described in greater detail with reference to FIG. 3.

Figure 3:
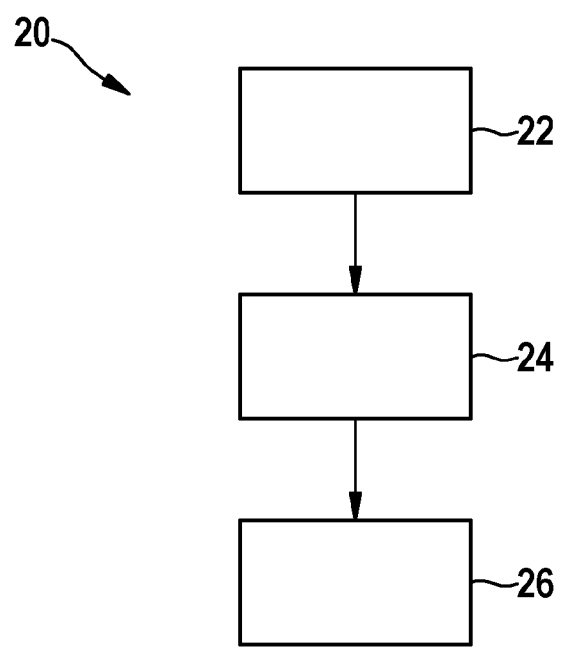
FIG. 3 shows an exemplary embodiment of the method for dimensioning a component of a braking system according to the present invention.

FIG. 3 shows a method 20 for dimensioning a component of a braking system, braking system 2 having at least two brake-circuit partial circuits A, B, each brake-circuit partial circuit A, B having at least one pump element 12 for building up a brake-circuit partial circuit pressure, pump elements 12 of the at least two brake-circuit partial circuits A, B being operable using a motor element 10, and the at least two brake-circuit partial circuits A, B being separable using a separating element 8, so that different brake-circuit partial circuit pressures may be produced in the at least two brake-circuit partial circuits A, B, having the steps of determining 22 a first, defined operating point of a first operating state of brake circuit system 1, the operating point, including a first torque and a first speed of a motor element 10 in the first operating state, and determining 24 a second, defined operating point of a second operating state of brake circuit system 2, the operating point, including a second torque and a second speed of a motor element 10 in the second operating state, characterized by dimensioning 26 of the pump elements in such a way that an operating point of motor element 10 results in the second operating state, which is shifted from the second operating point in the direction of the first operating point.

What is claimed is:

1. A method for dimensioning a component of a braking system that includes at least two brake-circuit partial circuits, each brake-circuit partial circuit having at least one pump element for at least one of building up a brake-circuit pressure and returning brake-circuit fluid in an ABS case, pump elements of the at least two brake-circuit partial circuits being operable using a motor element, and the at least two brake-circuit partial circuits being separable using a separating element, so that different brake-circuit pressures may be produced in the at least two brake-circuit partial circuits, the method comprising:
    determining a first, defined operating point of a first operating state of the braking system, the first operating point including a first torque and a first speed of the motor element in the first operating state;
    determining a second, defined operating point of a second operating state of the braking system, the second operating point including a second torque and a second speed of the motor element in the second operating state;
    dimensioning the pump elements in such a way that in the second operating state, a shifted second operating point of the motor element arises, which is shifted along a motor characteristic curve of the motor element from the determined second operating point in a direction of the first operating point, whereby in a third operating state, an increase of a delivery capacity of at least one of the pump elements results such that a first volume flow rate of the at least one of the pump elements in the third operating state is increased to a second volume flow rate in the third operating state that is higher than the first volume flow rate.

2. The method as recited in claim 1, wherein the shifted second operating point of the motor element in the second operating state essentially corresponds to the first operating point.

3. The method as recited in claim 1, wherein the first operating point is an essentially extremal permissible operating point of the braking system, and wherein the second operating point is a permissible operating point of the braking system.

4. The method as recited in claim 1, wherein in the first operating state, the at least two brake-circuit partial circuits are not separated, and wherein in the second operating state, the at least two brake-circuit partial circuits are separated using the separating element.

5. The method as recited in claim 1, wherein the second operating state is an ABS operating state of the braking system.

6. A braking system for a vehicle, comprising:
    a motor element;
    at least two brake-circuit partial circuits, each brake-circuit partial circuit having at least one pump element for building up a brake-circuit pressure, the pump elements of the at least two brake-circuit partial circuits being operable using the motor element; and
    a separating element for separating the at least two brake-circuit partial circuits, so that different brake-circuit pressures may be produced in the at least two brake-circuit partial circuits, wherein:
        a first, defined operating point of a first operating state of the braking system is determinable, the first operating point including a first torque and a first speed of the motor element in the first operating state; and
        a second, defined operating point of a second operating state of the brake circuit system is determinable, the second operating point including a second torque and a second speed of the motor element in the second operating state, and
        the pump elements are dimensioned in such a way that a shifted second operating point of the motor element arises in the second operating state, which is shifted along a motor characteristic curve of the motor element from the determined second operating point in a direction of the first operating point, whereby an increase of a delivery capacity of at least one of the pump elements results in a third operating point such that a first volume flow rate of the at least one of the pump elements in the third operating state is increased to a second volume flow rate in the third operating state that is higher than the first volume flow rate.

7. The braking system as recited in claim 6, wherein the shifted second operating point of the motor element in the second operating state essentially corresponds to the first operating point.

8. The braking system as recited in claim 6, wherein the first operating point is an essentially extremal permissible operating point of the braking system, and wherein the second operating point is a permissible operating point of the braking system.

9. The braking system as recited in claim 6, wherein in the first operating state, the at least two brake-circuit partial circuits are not separated, and wherein in the second operating state, the at least two brake-circuit partial circuits are separated using the separating element.

10. The braking system as recited in claim 6, wherein the second operating state is an ABS operating state of the braking system.

11. The braking system as recited in claim 6, wherein a first of the at least two brake-circuit partial circuits is associated with a front axle of the vehicle, and wherein a second of the at least two brake-circuit partial circuits is associated with a rear axle of the vehicle.

12. The braking system as recited in claim 6, wherein the operating point of the motor element is determinable as a counter torque M of the motor element using the formula $$M = M_{fric} + \frac{\pi}{4} * e * (p_1 * d_1^2 - p_2 * d_2^2)$$

for friction torque $M_{fric}$, eccentricity e of the at least one pump elements, and pressures $p_1$ and $p_2$ in first and second brake-circuit partial circuits of the at least two brake-circuit partial circuits, and wherein the two pump elements are implemented as pump elements having diameter d1>d2, in particular d1=7.5 mm and d2=6 mm.

13. A vehicle, comprising:
a braking system, including:
  a motor element;
  at least two brake-circuit partial circuits, each brake-circuit partial circuit having at least one pump element for building up a brake-circuit pressure, the pump elements of the at least two brake-circuit partial circuits being operable using the motor element; and
  a separating element for separating the at least two brake-circuit partial circuits, so that different brake-circuit pressures may be produced in the at least two brake-circuit partial circuits, wherein:
    a first, defined operating point of a first operating state of the braking system is determinable, the first operating point including a first torque and a first speed of the motor element in the first operating state; and
    a second, defined operating point of a second operating state of the brake circuit system is determinable, the second operating point including a second torque and a second speed of the motor element in the second operating state, and
  the pump elements are dimensioned in such a way that a shifted second operating point of the motor element arises in the second operating state, which is shifted along a motor characteristic curve of the motor element from the determined second operating point in a direction of the first operating point, whereby an increase of a delivery capacity of at least one of the pump elements results in a third operating point such that a first volume flow rate of the at least one of the pump elements in the third operating state is increased to a second volume flow rate in the third operating state that is higher than the first volume flow rate.

* * * * *